United States Patent [19]
Avitan

[11] Patent Number: 5,453,672
[45] Date of Patent: Sep. 26, 1995

[54] REGULATION SYSTEM FOR DECOUPLED EFFICIENCY OPTIMIZED OPERATION OF DC TRACTION MOTORS

[76] Inventor: Isaac Avitan, c/o Schaeff, Inc., P.O. Box 9700, Sioux City, Iowa 51102-9700

[21] Appl. No.: 216,152

[22] Filed: Mar. 21, 1994

Related U.S. Application Data

[63] Continuation-in-part of Ser. No. 815,395, Dec. 31, 1991.
[51] Int. Cl.$^6$ .................................................. H02P 5/16
[52] U.S. Cl. ................................. 318/493; 388/801
[58] Field of Search ................................. 318/766, 539, 318/139, 493; 388/800–808, 907.5, 910

[56] References Cited

U.S. PATENT DOCUMENTS

| | | | |
|---|---|---|---|
| 3,735,220 | 5/1973 | Renner et al. | 318/139 |
| 4,037,144 | 7/1977 | Ohmae et al. | 318/493 X |
| 4,247,807 | 1/1981 | Wilson . | |
| 4,284,932 | 8/1981 | Kawada et al. | 318/493 X |
| 4,408,147 | 10/1983 | Gabel | 318/493 |
| 4,784,117 | 11/1984 | Bose | 318/493 X |
| 4,845,413 | 7/1989 | Hackl et al. | 318/493 X |
| 5,039,924 | 8/1991 | Avitan . | |
| 5,070,283 | 12/1991 | Avitan . | |

OTHER PUBLICATIONS

Microporcessor Based High Efficiency Drive of DC Motor, by Hong and Park IEEE, vol. 1–E–34, pp. 433–440 Nov. 1987.

Primary Examiner—David S. Martin
Attorney, Agent, or Firm—Natter & Natter

[57] ABSTRACT

A regulation system for controlling a dc motor having a separately excited armature and field includes microprocessor based pulse width (duty cycle) and frequency modulation control of an armature amplifier and a field amplifier. Motor operating efficiency is optimized through microprocessor control of the field amplifier as a function of actual armature current, actual field current and desired armature speed. Sensed armature current is multiplied by a fixed optimal field constant to generate an optimal field current control signal. The optimal field current control signal is summed with a signal representative of field current required for desired armature speed less a signal representative of actual field current to generate a field current error signal. A controller receives the field current error signal and generates a pulse width modulated field current control effort signal which is applied to the field amplifier. An armature voltage controller receives an input signal which is the difference between desired armature speed and actual armature speed. The input signal is generated only when actual field current exceeds a predetermined field saturation current value. The controller generates a pulse width modulated armature control effort signal which is applied to the armature amplifier only if actual armature current is below the maximum allowable armature current.

15 Claims, 3 Drawing Sheets

REGULATION SYSTEM FOR DECOUPLED EFFICIENCY OPTIMIZED OPERATION OF DC TRACTION MOTORS

RELATED APPLICATION

This application is a continuation-in-part of application Ser. No. 07/815,395, filed Dec. 31, 1991, for the invention entitled Speed Regulation of dc Motors Using Current Sensing Means.

BACKGROUND OF THE INVENTION

1. Field of the Invention

This invention relates generally to control systems for dc traction motors and more particularly to systems for separately driving the armature and field circuits of a dc traction motor while optimizing energy efficiency.

2. Related History

DC electric motors have functioned as a motive source in various vehicles ranging from trains, to boats, automobiles, delivery vans, golf carts, trucks and fork lift vehicles. In many applications including automobiles, material handling trucks and fork lifts, the on-board stored energy supply comprised batteries which accounted for a significant proportion of the total vehicle weight. Depending upon the vehicle application, motor torque loads significantly varied and were affected by vehicle load variations, the incline of the travel path, (such as a loading ramp) and vehicle acceleration. It was common for vehicle pay-load variations to represent a change in the order of 33% of the total motor torque requirements.

In vehicles wherein the motive energy was furnished by an on-board battery system, the main motive element, commonly known as a traction system, included a series-wound dc motor coupled to one or more drive wheels through a reduction gear. Control of the direction of rotation of the motor was effected by controlling the polarity across the motor field-armature. Series-wound dc motors were limited to operation along their characteristic commutation curve and, as a result, variations in torque load resulted in variations of motor speed, hence vehicle speed.

Separately excited motor control systems have been devised for independently and variably exciting the armature and field windings and thus remove the constraint of operation only along the motor's commutation curve limit. It has been found impractical, however, to implement systems with separately excited and variable armature and field control in conjunction with series-wound dc motors because the field current levels of such motors required large and relatively expensive control systems, specifically the field control portion of the control systems.

The substitution of shunt-wound dc motors for reducing the size and cost of the control systems as opposed to series-wound dc motors has been attempted. Under conventional control, wherein the field excitation of a shunt wound dc motor was constantly applied, the shunt-wound dc motor was incapable of providing a high starting torque and could not serve as a replacement for a series-wound dc motor. With the use of a motor control system wherein the armature and field of a shunt-wound dc motor were separately excited and variably controlled, shunt-wound dc motors were capable of operating with the high starting torque characteristics of a series-wound dc motor.

Systems for controlling a separately excited shunt-wound dc motor though microprocessor-based independent pulse width modulated frequency control of an armature chopper and a field H-bridge were disclosed in U.S. Pat. No. 5,070,283 and U.S. Pat. No. 5,039,924, both of which were issued to the present applicant.

The inventions disclosed in the aforementioned patents generally comprised an armature voltage amplifier connected to the shunt-wound dc motor armature for varying the applied armature voltage and a field current amplifier for controlling the direction of armature rotation and for varying the voltage applied to the field winding. Rather than allowing the field current to follow armature status, a processor was employed to effect complete decoupling of torque and speed characteristics (patent 5,070,283). The processor received signals representative of a reference armature speed value and a reference armature current value and employed matrix algebra to transform such signals into filtered input references. A controller received signals representative of sensed armature current and sensed armature speed and generated conditioned motor output signals, utilizing matrix algebra. The difference between one of the filtered input reference signals and one of the conditioned motor output signals comprised a decoupling armature effort signal applied to the armature amplifier and the difference between the other filtered input reference and the other conditional motor output comprised a decoupling field effort signal applied to the field circuit. Both decoupling effort signals were generated for maintaining constant armature speed with varying torque loads.

In patent 5,039,924, motor efficiency was optimized with a processor which controlled the field current amplifier responsive to desired armature speed, sensed armature speed, sensed armature current and sensed field current. The processor functioned with a feedback controller which generated an optimal ratio as a function of the sensed armature speed and the sensed field current.

While the systems disclosed in these prior patents functioned to provide motor operation capable of producing variable torque while maintaining constant speed or functioning to optimize motor efficiency, such systems were subject to certain disadvantages in terms of cost and practical efficiency.

The systems disclosed in both of the aforementioned patents functioned independently of each other and required separate algorithm sets for different conditions and could not be incorporated for simultaneous operation in a single system.

Additionally, the prior optimization system was premised upon the unnecessary constraint that armature control must operate totally independent of field control and field control must operate totally independent of the armature control whereas practical implementation must recognize the status of the armature circuit for optimized field control and the status of the field circuit for armature control.

The operational constraints for totally independent control found in patents 5,039,924 and 5,070,283 required complex and unnecessary programing from a practical system operation standpoint and significant manufacturing costs in terms of initial programming expense and hardware configuration.

Further, the applicant realized that by driving only the armature circuit to maintain constant speed under varying torque loads and allowing the field current to follow the driven armature current, adequate decoupling of torque and speed characteristics could be attained which would suffice for practical implementations, without the added cost and complexity of separately driving the field circuit to achieve decoupling control.

The applicant herein has appreciated that interrelationships between armature and field conditions, such as, mutual inductance, mandate a control system wherein the field and armature are not driven totally independently of one another.

Further, the applicant herein recognized the need for a single control system capable of simultaneously providing practical levels of torque/speed decoupling and simultaneous optimization of motor efficiency.

SUMMARY OF THE INVENTION

A regulating system for a dc traction motor provides through armature circuit regulation, speed commutation curve characteristics of a motor and through field circuit control, simultaneous optimization of motor efficiency. The system incorporates microprocessor-based pulse width (duty cycle) and frequency modulation control of separately excited field and armature circuits of a shunt-wound dc motor.

Optimization of motor efficiency is achieved through processor control of a field current (H-bridge) amplifier and control of an armature voltage amplifier.

A value representative of sensed armature current is divided by an optimal ratio comprising the square root of field resistance over armature resistance to generate an optimal field current control signal which is summed with a signal representative of field current required for the desired armature speed less a signal representative of actual field current to generate field current error signal.

The field current error signal is received at a field current controller which generates a pulse-width (duty cycle) modulated field current control effort signal. The field current demand signal is applied to the drivers of an H-bridge circuit together with a predetermined field frequency signal for frequency and pulse width modulation control of field current for optimized decoupled control of the field circuit.

An armature voltage controller receives a control signal which is a function of desired armature speed and actual armature speed. The control signal is generated only when the actual field current exceeds a predetermined field saturation current value. The controller generates a pulse width (duty cycle) modulated armature control effort signal indicative of the control effort required to equate the actual armature speed with the desired armature speed only after the field is fully saturated. When the armature current level is below the maximum allowable armature current, the pulse width modulated control effort signal is applied to the driver of a chopper circuit (armature amplifier).

An armature frequency controller also receives the pulse width modulated control effort signal and generates a desired armature frequency signal as a function of the pulse width modulated control effort signal. The desired armature frequency signal is applied to the base driver of the chopper circuit along with the pulse width modulated control effort signal for both variable frequency and pulse width, i.e., duty cycle, modulation control of the chopper circuit.

From the foregoing compendium, it will be appreciated that it is an aspect of the present invention to provide a regulation system of the general character described for simultaneous field optimized and armature decoupled torque/speed operation of dc traction motors which is not subject to the disadvantages of the background history aforementioned.

A consideration of the present invention is to provide a regulation system of the general character described for both field optimized and armature decoupled torque/speed operation of dc traction motors, wherein armature and field control are interrelated.

A feature of the present invention is to provide a regulation system of the general character described for decoupled torque/speed operation through armature circuit control of dc traction motors which simultaneously functions to optimize operating efficiency through field circuit control.

Another consideration of the present invention is to provide a regulation system of the general character described for both field optimized and armature decoupled torque/speed operation of dc traction motors which implements microprocessor based pulse width modulation and frequency control of a chopper and an H-bridge circuit.

Another feature of the invention is to provide a regulation system of the general character described for both field optimized and armature decoupled torque/speed operation of dc traction motors wherein the detrimental effects of mutual inductance which would be encountered upon simultaneous energization of the armature and field circuits are avoided.

Yet a further aspect of the present invention is to provide a regulation system of the general character described which achieves optimized efficiency and practical levels of decoupled torque/speed operation in dc traction motors with reduced programming requirements.

To provide a regulation system of the general character described which is relatively low in cost and is suitable for economical mass production fabrication is yet another feature of the present invention.

With these ends in view, the invention finds embodiment in certain combinations of elements, arrangements of parts and series of steps by which the said aspects, features and considerations and certain other aspects, features and considerations are hereinafter attained, all as more fully described with reference to the accompanying drawings and the scope of which is more particularly pointed our and indicated in the appended claims.

BRIEF DESCRIPTION OF THE DRAWINGS

In the accompanying drawings, in which is shown one of the various possible exemplary embodiments of the invention.

DESCRIPTION OF THE PREFERRED EMBODIMENT

Figure 1:
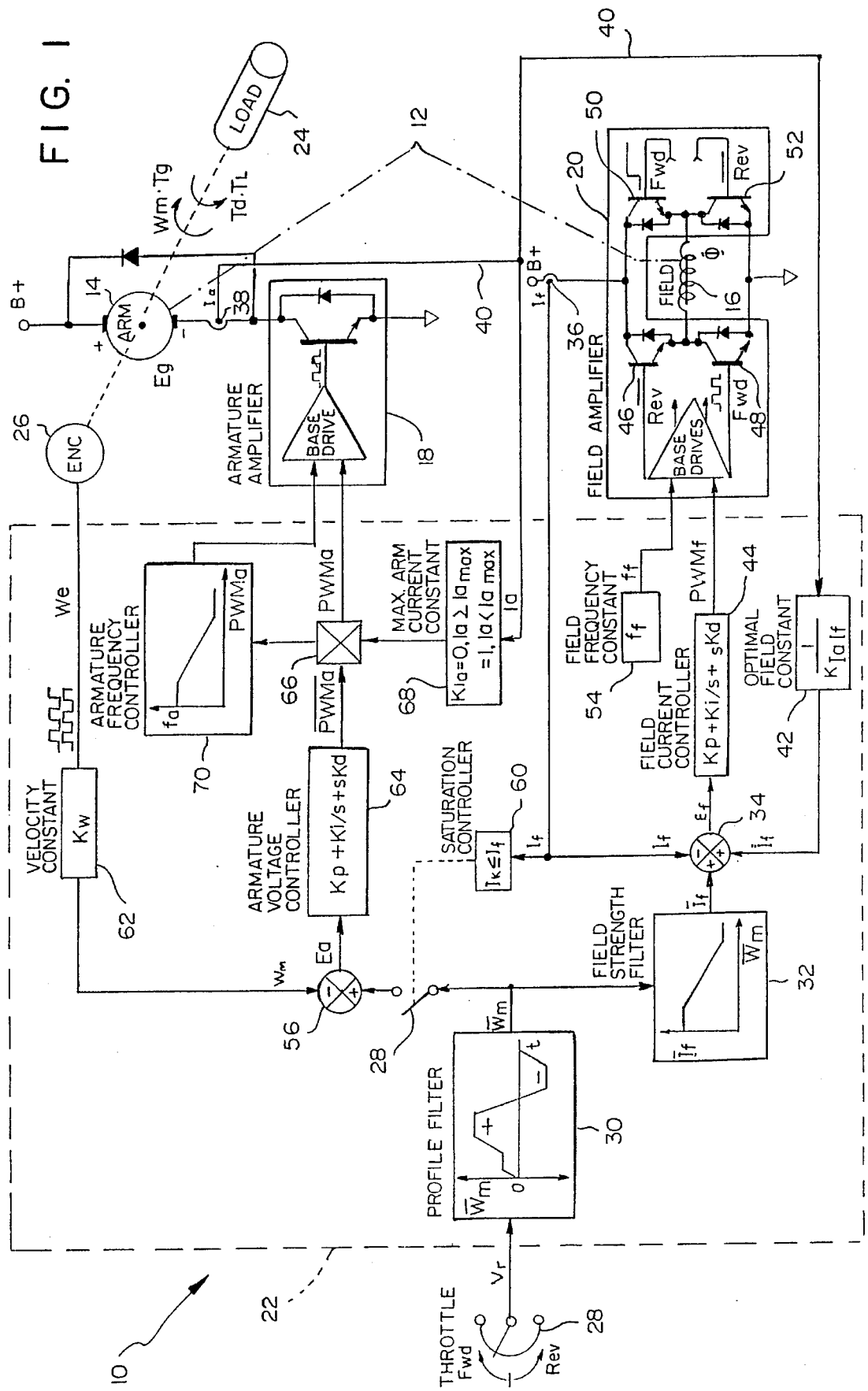
FIG. 1 is a schematized block diagram of a regulation system for simultaneous field optimized and armature decoupled torque/speed operation of dc traction motors in accordance with the present invention and showing a dc traction motor operating under a torque load and with a chopper circuit controlling an armature and an H-bridge circuit controlling a field coil.

Referring now in detail to the drawings, the reference numeral 10 denotes generally a regulation system constructed in accordance with and embodying the invention for combined field circuit optimized and armature circuit decoupled torque/speed operation in a dc traction motor. The regulation system 10 controls the operation of a dc traction motor 12 which comprises an armature 14 and a field coil 16, depicted in schematized format in FIG. 1 as separated from one another and joined together by dot and dash lines.

The armature 14 is separately excited from the field coil 16 and current flow from a battery source B+ through the armature 14 is under the control of an armature amplifier or chopper circuit 18. Similarly, the motor field coil 16 is energized from the battery source B+ through an H-bridge field control circuit 20.

Pursuant to the invention, optimization of efficiency and simultaneous decoupling of torque/speed characteristics of the motor 12 is achieved through the employment of a microprocessor 22.

It should be noted, from an observation of FIG. 1, that the armature 14 is depicted in an operating state rotating at a speed $W_m$ and generating a torque $T_g$ while driving a load 24 having a torque load $T_1$ with a viscous damping torque loss $T_d$. Associated with the armature 14 is an encoder 26 which generates a signal $W_e$, the frequency of which is a function of actual, i.e. instantaneous, armature rotation speed.

An operator throttle 28 generates a signal $V_r$ which is representative of the desired armature rotational speed. The throttle signal $V_r$ is received at a profile filter 30 which, in turn, generates a desired rotational direction/speed signal $\bar{W}_m$.

The desired rotational direction/speed signal $\bar{W}_m$ applied to a field strength filter 32 which, in turn, generates a reference signal $\bar{I}_f$, representative of the desired field current necessary to support the desired rotational direction/speed. The field current reference signal $\bar{I}_f$ is generated by the field strength filter 32, premised upon the phenomena of field weakening and field strengthening.

Armature response is a function of field air gap flux which affects back. EMF and generated torque torque $T_g$. When the field current is reduced, the air gap flux is reduced, which reduces back EMF which increases armature current, resulting in increased armature speed $W_m$.

The desired field current signal $\bar{I}_f$ is selected by the field strength filter 32 based upon desired rotational direction/speed $\bar{W}_m$. At low values of $\bar{W}_m$ it is desirable to strengthen the field and vice versa. A typical range of desired field current signals may be in the order of 4 to 30 amps. The signal $\bar{I}_f$ is applied to a summer 34 to be summed with further signals representative of the instantaneous conditions of motor operation.

A signal 36, indicative of actual field current, $I_f$ is read at a field current tap 36 and applied to the summer 34. Additionally applied to the summer 34 is a signal $\bar{I}_f$, representative of optimal field current value, which is a function of actual armature current.

Actual armature current $I_a$, is read at an armature current tap 38. A line 40 extends from the armature current tap 38 to an optimal field constant multiplier 42. At the optimal field constant multiplier 42, the actual armature current $I_a$ is divided by an optimal field constant ratio $K_{Iaf}$. The optimal field constant ratio $K_{Iaf}$ comprises the square root of the field resistance divided by the armature resistance as indicated in U.S. Pat. No. 4,247,807 issued Jan. 27, 1981 to Wilson and incorporated herein by reference.

Generation of the optimal field ratio is defined, in *Microprocessor-Based High Efficiency Drive of a DC Motor*, IEEE Volume 1 E-34, No. 4 by Hong and Park pp. 433–440 equation 5 (p. 434) however, such equation may be further reduced to the square root of field resistance over armature resistance. The optimal field constant multiplier 42 generates an optimal field current control signal $\bar{I}_f$ which is applied to the summer 34 together with the signal $I_f$.

The summer 34 generates an error signal $E_f$, representative of field current error which comprises the sum of the desired field current signal $\bar{I}_f$ and the optimal field current control signal $\bar{I}_f$ less the actual field current $I_f$. The field current error signal, $E_f$ is applied to a field current controller 44.

The field current controller 44 may comprise, for example, a proportional/integral/derivative controller which sums proportional, derivative and integral gain portions to generate a pulse width (duty cycle) modulated field current control effort signal, $PWM_f$. Alternatively, other controllers such as fuzzy logic controllers may be employed.

The pulse width (duty cycle) modulated field current control effort signal $PWM_f$ is applied to base drives of four transistors 46, 48, 50 and 52 of the H-bridge circuit 20. For frequency modulation control of the H-bridge circuit 20, a field frequency constant generator 54 generates a field frequency signal $f_f$ which is also applied to the base drives of the transistors 46, 48, 50 and 52. The fixed frequency is optimally selected at approximately 400±50 hz, which represents a compromise between switching loss characteristics and field current ripple.

To provide decoupled torque/speed armature control, the regulation system 10 also applies the desired rotational direction/speed reference signal $\bar{W}_m$ to a summer 56 through a conventional switching device 58 which may function as a transistor under the control of a saturation controller 60.

The saturation controller 60 operates as a comparator which generates a signal for closing the switching device 58 only if actual field current $I_f$ equals or exceeds a predetermined magnetic saturation field current limit $I_k$. The saturation controller 60 and the switching device 58 thus serve to assure that the chopper circuit will not be activated unless sufficient field current exists to fully saturate the field. As such, the mutual inductance drop in field current which is in response to the application of a step-input to the armature will be accommodated.

Once the field is saturated, the switching device 58 closes and the desired rotational direction/speed signal $\bar{W}_m$ applied to the summer 56. Additionally applied to the summer 56 is a signal $W_m$ representative of actual armature speed. Such signal is derived from the armature encoder 26 which generates the signal $W_e$ which is indicative of instantaneous armature speed. The signal $W_e$ is received at a velocity constant multiplier 62 and multiplied by a velocity constant to generate the actual armature rotational speed signal $W_m$.

The summer 56 generates an output signal $E_a$ representative of armature error or demand. The armature error signal $E_a$ is applied directly to an armature voltage controller 64 which may comprise a proportional/integral/derivative controller or a fuzzy logic controller and generates a pulse width (duty cycle) modulated output signal $\overline{PWM}_a$, representative of armature control effort signal.

The $\overline{PWM}_a$ signal is transmitted to a multiplier 66. Also transmitted to the multiplier is a maximum armature current constant $K_{Ia}$.

The maximum armature current constant $K_{Ia}$ has a value of either 0 or 1 depending upon whether or not actual armature current is greater than a predetermined maximum allowable current. The multiplier 66 thus functions as a gate.

In order to generate the maximum armature current constant signal $K_{Ia}$, a maximum armature current constant generator 68 is provided. The generator 68 receives the actual armature current signal $I_a$ appearing on the line 40 and generates a low armature current constant signal, i.e. 0, if the actual armature current is equal to or greater than the maximum permitted armature current. In the event the actual armature current is less than the maximum permitted armature current, the generator generates a high armature current constant signal, i.e. 1.

In the event the armature current constant signal is high, the multiplier 66 generates a pulse width (duty cycle) modulated armature control effort signal $PWM_a$, which is the same as the signal $\overline{PWM}_a$ generated by the armature voltage controller 64.

The pulse width (duty cycle) modulated signal $PWM_a$ is applied to the base drive circuitry of the armature amplifier or chopper circuit 18.

Simultaneously applied to the chopper circuit base drive is an armature frequency signal $f_a$ which is generated by an armature frequency controller 70. The armature frequency controller 70 receives the pulse width modulated armature control effort signal $PWM_a$ and in turn, generates the corresponding armature frequency signal $f_a$.

A relatively high frequency signal e.g. 5,000 hz, is desired, at low duty cycle and relatively low frequency signal $f_a$, e.g. tending towards zero, is desired when the duty cycle is relatively high. Since the armature winding represents a sixth order system with little inductance, armature frequency selection is primarily based upon current ripple.

Figure 2:
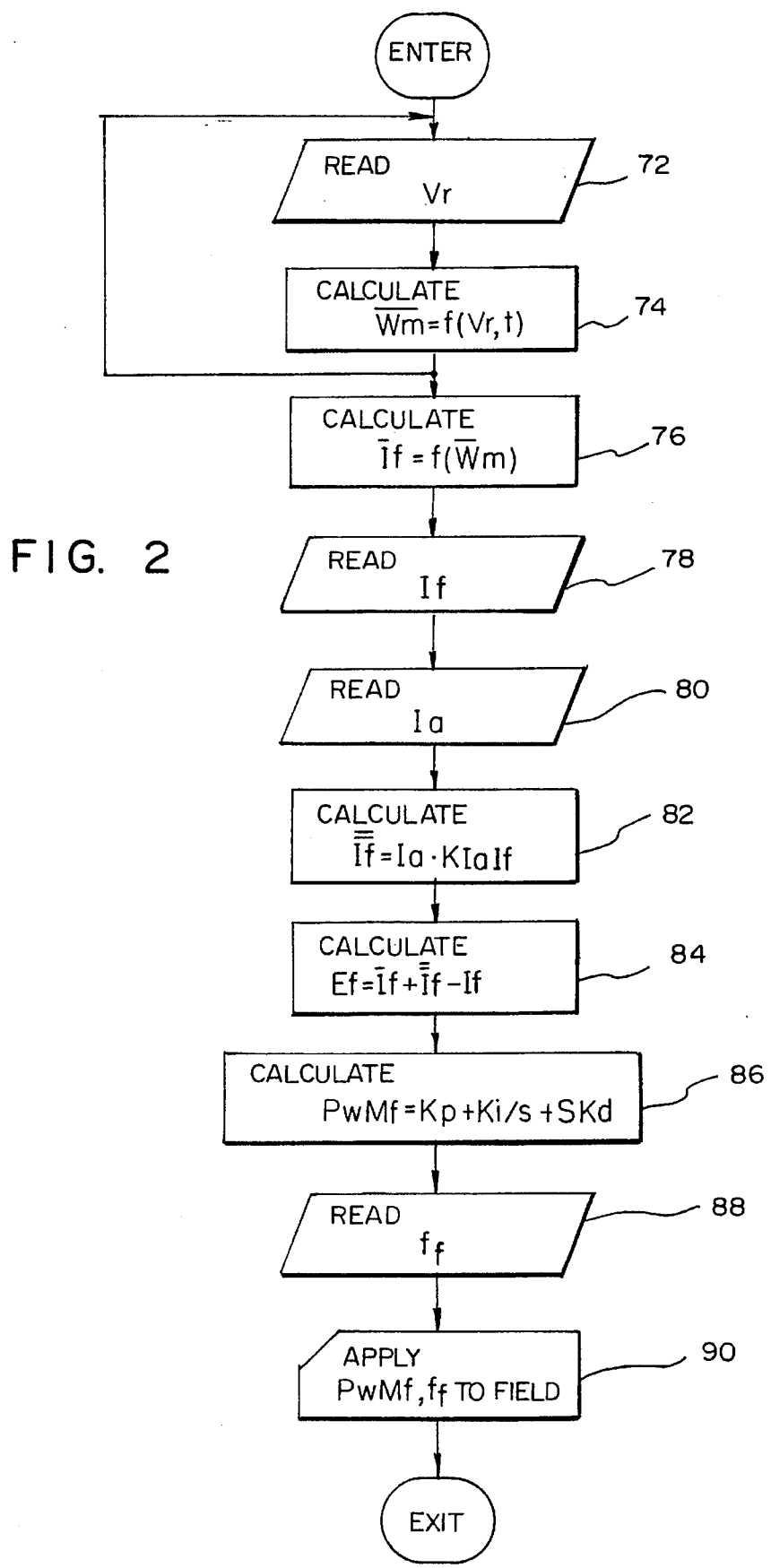
FIG. 2 is a flow chart of the regulation system operation in conjunction with optimized decoupled control of the H-bridge circuit; and, FIG. 3 is a flow chart showing operations of the regulation system in conjunction with control of the chopper circuit.

Referring now to FIG. 2 wherein a flow chart of the operation of the regulation system in conjunction with control of the H-bridge circuit is shown, it will be seen that the microprocessor 22 first reads the throttle signal $V_r$ as illustrated in a block 72. Thereafter, the desired rotational direction/speed signal $\bar{W}_m$ which is a function of the throttle signal $V_r$ and time is calculated as illustrated in a block 74. The steps of reading the throttle signal and computing the desired rotational direction/speed signal is a continuing one as indicated by a return loop in FIG. 2.

After the desired rotational direction/speed signal $\bar{W}_m$ is calculated, the desired field current signal $\bar{I}_f$ is computed as indicated at a block 76.

The microprocessor is programmed to then read the actual field current $I_f$ as indicated in a step 78, read the actual armature current as indicated in a block 80 and then calculate the optimal field current control signal $\bar{I}_f$ by dividing the actual armature current by the optimal field constant as illustrated in a block 82.

The microprocessor is then programmed to calculate the field current error signal $E_f$ by adding the optimal field current control signal and the desired field current and subtracting the actual field current as indicated in a block 84.

Thereafter, the microprocessor proceeds to calculate the pulse width (duty cycle) modulated field current control effort signal $PMW_f$ as indicated in a block 86. The microprocessor is programmed to additionally read the field frequency signal $f_f$, generated by the field frequency constant generator 54, as indicated in a block 88.

Finally, the microprocessor 22 applies the pulse width (duty cycle) modulated field current control effort signal $PMW_f$ together with the field frequency signal $f_f$ to the H-bridge circuit 20, as indicated at a step 90.

Figure 3:
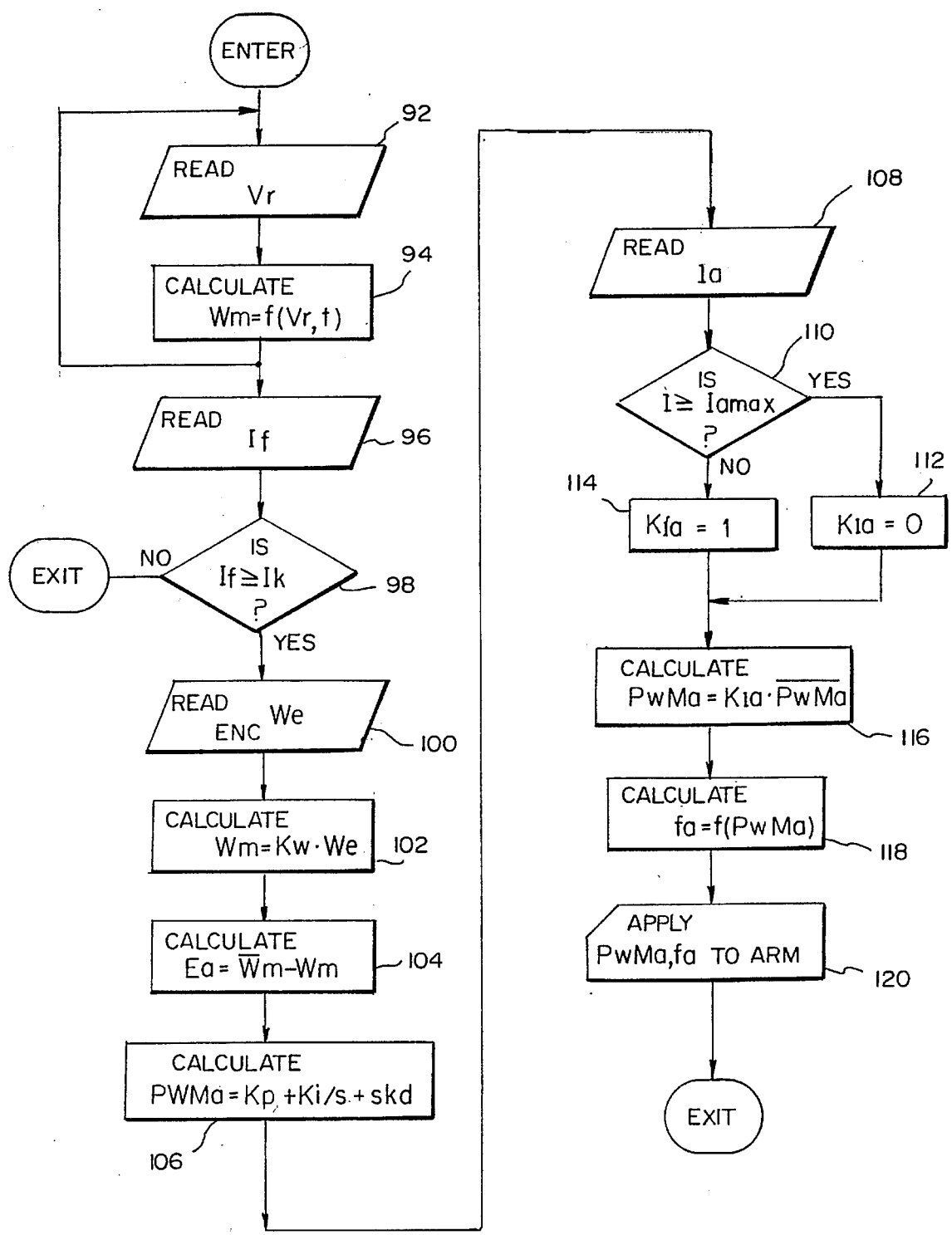

Turning now to FIG. 3 wherein a flow chart of the regulation system operation for decoupled torque/speed control of the armature 14 is illustrated, it should be noted that, initially, the microprocessor 22 reads the throttle signal $V_r$ as indicated in a block 92. Thereafter, the desired rotational direction/speed signal $\bar{W}_m$ is calculated as a function of the throttle signal and time as indicated in a block 94. The steps of reading the throttle signal and calculating the desired rotational direction/speed signal is continuous as indicated by a return loop.

The program then proceeds with reading the actual field current as indicated by a step 96 and then determines whether or not the field current level is sufficient to saturate the field as indicated in a step denoted 98. If the field current is insufficient, the program exits; if the field current is sufficient, hence the field is saturated, the program then proceeds to read the armature speed signal $W_e$, generated by the encoder 14, as indicated in a block 100 and then calculates the armature rotational speed signal $W_m$ as a function of the encoder signal $W_e$, as indicated in a block denoted 102.

The armature error or demand signal $E_a$ is calculated at a step 104 by subtracting the actual armature speed signal $W_m$ from the rotational direction/speed reference signal $\bar{W}_m$.

Thereafter, the armature control effort signal $\overline{PWM}_a$ is computed as indicated in a block 106.

The program then proceeds to read the actual armature current as indicated in a block 108. A determination is thereafter made as to whether or not the actual armature current is less than the maximum permissible armature current as indicated in a block 110.

If the actual armature current is equal to or greater than the maximum permissible, a zero output armature current constant signal is generated as indicated in block 112, while if the actual armature current is less than the maximum permissible, a unitary armature current constant output signal is generated as indicated in a block 114.

The microprocessor then proceeds to multiply the armature control effort signal $PWM_a$ by the armature constant, either zero or one, and generate the pulse width (duty cycle) modulated armature control effort signal $PWM_a$ as indicated in a block 116.

Additionally, the program proceeds to calculate an armature frequency value as a function of the signal $PWM_a$ as indicated in a block 118 and apply the armature frequency signal $f_a$ and the pulse width (duty cycle) modulated armature control effort signal $PWM_a$ to the chopper circuit 18 as indicated in a block 120.

Thus, it will be seen that there is provided a regulation system for armature circuit decoupled torque/speed operation with simultaneous field circuit optimization of dc traction motors which achieves the various aspects, features and considerations of the present invention and which is well adapted to meet the conditions of practical usage.

Since various possible embodiments might be made of the present invention without departing from the spirit of the invention, and since various changes might be made in the exemplary embodiment shown herein, it is to be understood that all matter herein described or shown in the accompanying drawings is to be interpreted as illustrative and not in a limiting sense.

Having thus described the invention there is claimed as new and desired to be secured by Letters Patent:

1. A regulation system for controlling a dc motor having an armature and a field, the armature and the field being separately excited, the motor having a torque load, the system comprising:

(a) an armature amplifier, the armature amplifier interconnecting the armature with a power supply, (b) a field amplifier, the field amplifier interconnecting the field with the power supply, (c) means operatively connected to the armature for sensing instantaneous armature current, (d) means operatively connected to the field for sensing instantaneous field current, (e) means for determining instantaneous armature rotation speed, (f) means for generating a signal indicative of desired armature rotation speed, and (g) processing means operatively connected to the means for sensing instantaneous armature current, the means for sensing instantaneous field current, the means for sensing instantaneous armature speed and the means for generating a signal indicative of desired armature rotation speed, the processing means including
  (i) means for controlling armature speed independently of the torque load comprising a summer operatively connected to the means for generating a signal indicative of desired armature rotation speed and operatively connected to the means for determining instantaneous armature rotation speed, the summer generating an armature error signal representative of the difference between the desired armature rotation speed and the instantaneous armature rotation speed, and
  (ii) means for simultaneously controlling field current for optimized motor operating efficiency, the processing means being operatively connected to the armature amplifier for controlling speed independently of torque load and being operatively connected to the field amplifier for optimizing motor efficiency, the means for simultaneously controlling field current for optimized motor operating efficiency including means for generating a field current error signal and means for generating an optimal field current control signal, the means for generating the optimal field current control signal being operatively connected to the means for sensing instantaneous armature current, the means for generating an optimal field current control signal including means for dividing the instantaneous armature current by a fixed optimal field constant ratio, the field having a field resistance value and the armature having an armature resistance value, the fixed optimal field constant ratio comprising the square root of the field resistance value divided by the armature resistance value, the means for generating a field current error signal being operatively connected to the means for generating an optimal field current control signal.

2. A regulation system for controlling a dc motor as constructed in accordance with claim 1 wherein the processing means includes field strength filter means for generating a desired field current signal, the field strength filter means being operatively connected to the means for generating a signal indicative of desired armature rotation speed.

3. A regulation system for controlling a dc motor as constructed in accordance with claim 1 wherein the processing means further includes an armature voltage controller, the armature voltage controller receiving the signal representative of armature error and in response thereto, generating a pulse width modulated signal representative of armature control effort, the armature amplifier receiving the signal representative of armature control effort and in response thereto, controlling current flow from the power supply through the armature.

4. A regulation system for controlling a dc motor as constructed in accordance with claim 3 wherein the processing means further includes a field current controller, the field current controller receiving the field current error signal and generating a pulse width modulated field current control effort signal, the field amplifier receiving the field current control effort signal and in response thereto, providing optimized control of current flow from the power supply through the field.

5. A regulation system for controlling a dc motor as constructed in accordance with claim 1 wherein the processing means further includes a field current controller, the field current controller receiving the field current error signal and generating a pulse width modulated field current control effort signal, the field amplifier receiving the field current control effort signal and in response thereto, providing optimized control of current flow from the power supply through the field.

6. A regulation system for controlling a dc motor having an armature and a field, the armature and the field being separately excited, the motor having a torque lead, the system comprising:

(a) an armature amplifier, the armature amplifier interconnecting the armature with a power supply, (b) a field amplifier, the field amplifier interconnecting the field with the power supply, (c) means operatively connected to the armature for sensing instantaneous armature current, (d) means operatively connected to the field for sensing instantaneous field current, (e) means for determining instantaneous armature rotation speed, (f) means for generating a signal indicative of desired armature rotation speed, and (g) processing means operatively connected to the means for sensing instantaneous armature current, the means for sensing instantaneous field current, the means for sensing instantaneous armature speed and the means for generating a signal indicative of desired armature rotation speed, the processing means including:
  (i) means for controlling armature speed independently of the torque load as a function of desired armature rotation speed and instantaneous armature rotation speed,
  (ii) means for simultaneously controlling field current for optimized motor operating efficiency, the means for controlling field current including means for generating an optimal field current control signal as a function of instantaneous armature current, and
  (iii) field strength filter means for generating a desired field current signal, the field strength filter means being operatively connected to the means for generating a signal indicative of desired armature rotation speed, the means for simultaneously controlling field current for optimized motor operating efficiency further including a summer, the summer being operatively connected to the field strength filter means, the means for generating the optimal field current control signal and the means for sensing instantaneous field current, the summer adding the desired field current signal and the optimal field current control signal and subtracting therefrom, the instantaneous field current to generate a field current error signal.

7. A regulation system for controlling a dc motor as constructed in accordance with claim 6 wherein the processing means further includes a controller, the controller receiving the field current error signal and generating a pulse width modulated field current control effort signal, the field amplifier receiving the field current control effort signal and in response thereto, providing optimized control of current flow from the power supply through the field.

8. A regulation system for controlling a dc motor having an armature and a field, the armature and the field being separately excited, the motor having a torque load, the system comprising:

(a) an armature amplifier, the armature amplifier interconnecting the armature with a power supply, (b) a field amplifier, the field amplifier interconnecting the field with the power supply, (c) means operatively connected to the armature for sensing instantaneous armature current, (d) means operatively connected to the field for sensing instantaneous field current, (e) means for determining instantaneous armature rotation speed, (f) means for generating a signal indicative of desired armature rotation speed, and (g) processing means operatively connected to the means for sensing instantaneous armature current, the means for sensing instantaneous field current, the means for sensing instantaneous armature speed and the means for generating a signal indicative of desired armature rotation speed, the processing means including means for controlling armature speed independently of the torque load and means for simultaneously controlling field current for optimized motor operating efficiency, the processing means being operatively connected to the armature amplifier for controlling speed independently of torque load and being operatively connected to the field amplifier for optimizing motor efficiency, the means for controlling armature speed independently of torque load including a summer, means operatively interconnecting the means for generating a signal indicative of desired armature rotation speed with the summer, the means operatively interconnecting the means for generating a signal indicative of desired armature rotation speed with the summer comprising a saturation controller and means operatively interconnecting the saturation controller with the means for sensing instantaneous field current, the saturation controller including comparator means for determining if instantaneous field current equals or exceeds a predetermined saturation value, means interconnecting the means for determining instantaneous armature rotation speed with the summer, the summer receiving the signal indicative of desired armature rotation speed and subtracting therefrom the signal indicative of instantaneous armature rotation speed and generating a signal representative of armature error only after the field current has reached the predetermined saturation level.

9. A regulation system for controlling a dc motor as constructed in accordance with claim 8 wherein the processing means further includes a controller, the controller receiving the signal representative of armature error and in response thereto, generating a pulse width modulated signal representative of armature control effort, the armature amplifier receiving the signal representative of armature control effort and in response thereto, controlling current flow from the power supply through the armature.

10. A regulation system for controlling a dc motor as constructed in accordance with claim 9 further including means for determining whether or not instantaneous armature current is less than a predetermined maximum permissible value of armature current and means for permitting the pulse width modulated signal representative of armature control effort to be received at the armature amplifier only if instantaneous armature current is less than the predetermined maximum permissible value.

11. A regulation system for controlling a dc motor as constructed in accordance with claim 9 wherein the processing means further includes an armature frequency controller, the armature frequency controller receiving the pulse width modulated signal representative of armature control effort and in response thereto, generating an armature frequency signal, and means interconnecting the armature frequency controller with the armature amplifier, the armature amplifier receiving the armature frequency signal and the pulse width modulated signal representative of armature control effort and controlling current flow through the armature through both pulse width and frequency modulation.

12. A regulation system for controlling a dc motor having an armature and a field, the armature and the field being separately excited, the system comprising:

(a) an armature amplifier, the armature amplifier interconnecting the armature with a power supply, (b) a field amplifier, the field amplifier interconnecting the field with the power supply, (c) a controller for controlling the operation of the armature amplifier, the controller generating a signal for actuation of the armature amplifier, and (d) processing means for preventing the controller from generating the signal for actuation of the armature amplifier unless the field has reached a predetermined saturation level.

13. A regulation system for controlling a dc motor having an armature and a field in accordance with claim 12 wherein the processing means includes (a) means operatively connected to the field for sensing instantaneous field current, and (b) means operatively connected to the means for sensing instantaneous field current for determining whether the instantaneous field current has reached a value corresponding to the predetermined field saturation level.

14. A microprocessor implemented method of controlling a dc motor having an armature and a field, the armature and the field being separately excited, the method comprising the steps of:

(a) generating a signal representative of desired armature speed, (b) reading a signal representative of actual armature speed, (c) reading a signal representative of actual field current, (d) generating an error signal indicative of the difference between the desired armature speed and the actual armature speed, (e) determining an armature control effort as a function of the error signal, (f) determining whether the field has reached a predetermined saturation level by comparing the actual field current with a predetermined field current value corresponding to the desired field saturation level, and (g) applying the control effort to the armature only if the field saturation level has reached or exceeds the predetermined saturation level.

15. A regulation system for controlling a dc motor as constructed in accordance with claim 14 wherein the step of determining the armature control effort is performed only if the field saturation level has reached or exceeds the predetermined saturation level.

* * * * *